April 20, 1937.   E. A. SELL   2,077,534
SUCTION OPERATED DUMP DOOR FOR VEHICLES
Filed June 10, 1935   2 Sheets-Sheet 1

Inventor
E.A.Sell
By Arthur H. Sturges
Attorney

April 20, 1937.   E. A. SELL   2,077,534
SUCTION OPERATED DUMP DOOR FOR VEHICLES
Filed June 10, 1935   2 Sheets-Sheet 2
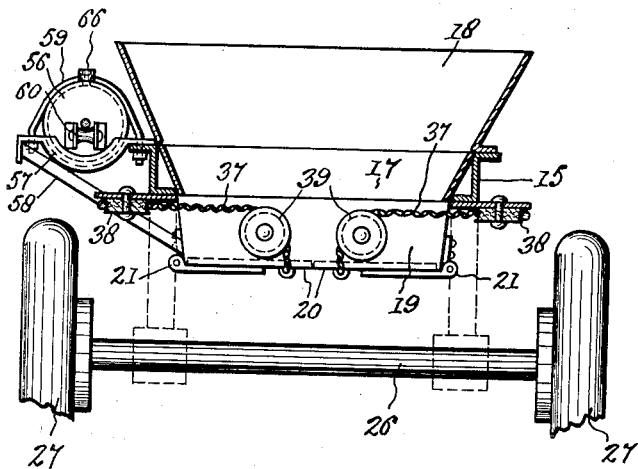
Fig. 3.
Fig. 4.
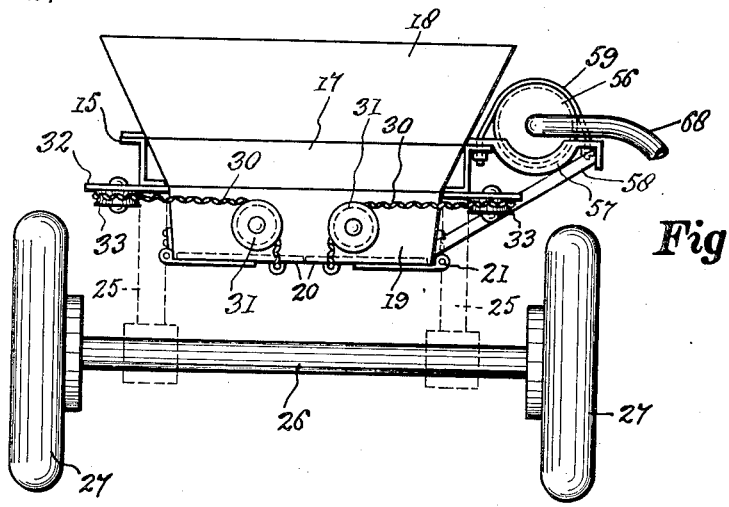
Fig. 5.
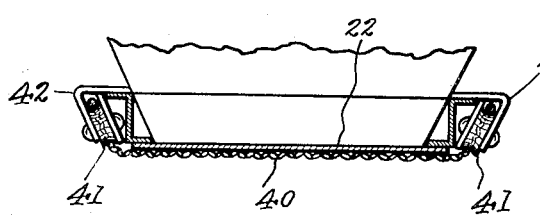
Fig. 6.
Inventor
E. A. Sell
Arthur H. Sturges
Attorney Patented Apr. 20, 1937

2,077,534

UNITED STATES PATENT OFFICE 2,077,534

SUCTION OPERATED DUMP DOOR FOR VEHICLES

Emil A. Sell, Omaha, Nebr.

Application June 10, 1935, Serial No. 25,848

3 Claims. (Cl. 298—29)

The present invention relates to vehicles, and more particularly to wagons of the bottom dump type.

An object of the present invention is to provide an improved and simplified means for raising the bottom doors or gates of the wagon body into closed position by utilizing the suction of the intake manifold of an internal combustion engine, such as on a tractor or the like which may be employed as the means of draft for the wagon.

Another object of the present invention is to provide an improved and simplified means for locking the bottom doors in raised or closed position, and for quickly and easily releasing the doors so that they may swing down into open position by gravity and also by the weight of the material carried in the body of the wagon.

Another object of the invention is to provide a mechanism which is operable by a single cylinder which may be conveniently mounted on the side of the wagon and which is operated solely by atmospheric air pressure and which does not require the use of oil or other hydraulic fluid which are employed in this general type of operating mechanism.

With the foregoing and other objects in view, the invention will be more fully described hereinafter, and will be more particularly pointed out in the claims appended hereto.

In the drawings, wherein like symbols refer to like or corresponding parts throughout the several views.

Figure 3 is a transverse section taken through the forward portion of the wagon body.

Figure 4 is a fragmentary enlarged sectional view taken through a portion of the cylinder, showing the double piston mounted therein.

Figure 5 is a rear elevation of the wagon having the improvements applied thereto, and Figure 6 is a fragmentary transverse section taken through the forward end portion of the wagon body.

Figures 1, 2:
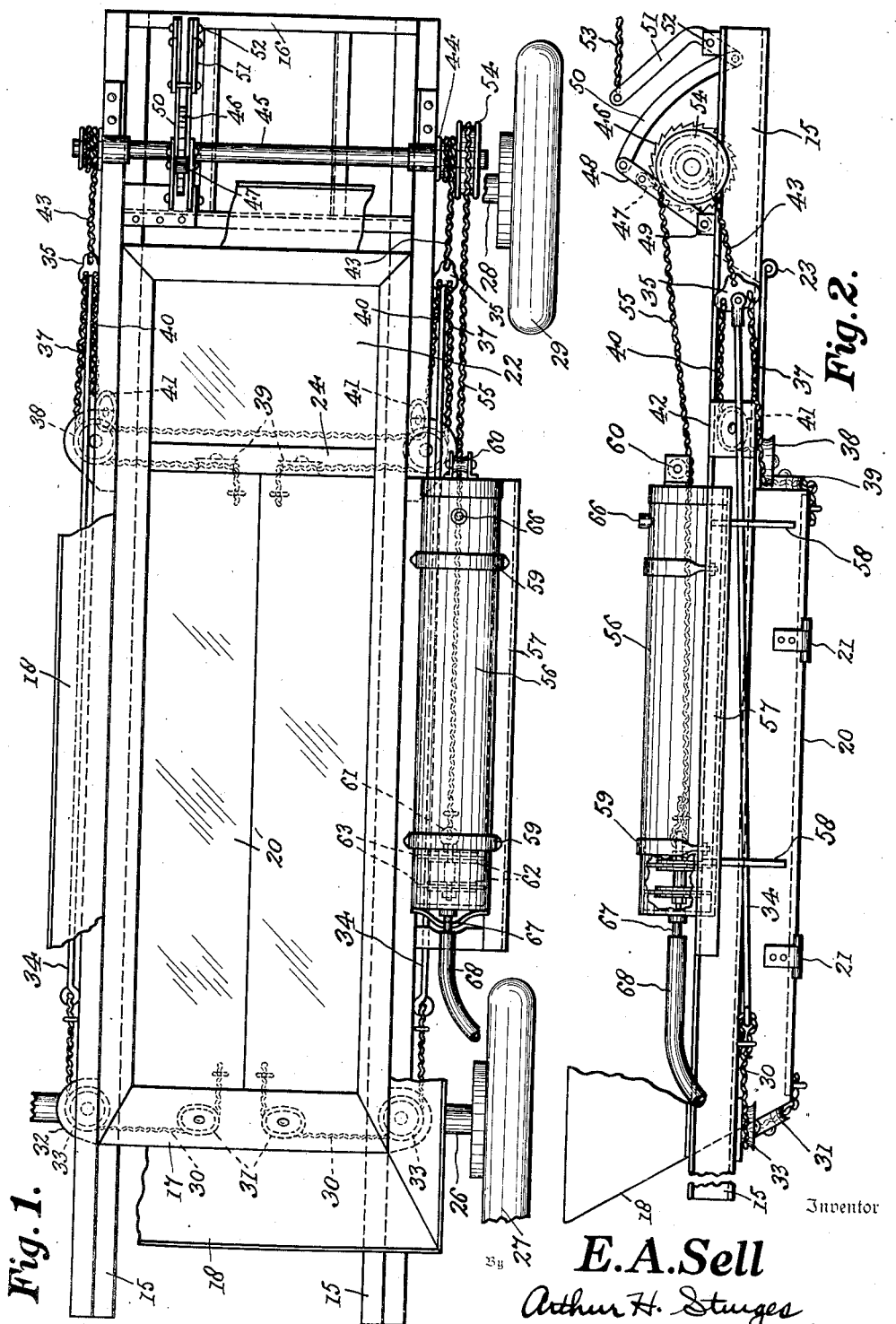
Figure 1 is a top plan view of a wagon constructed according to the present invention, parts being broken away and showing the door operating mechanism with the single operating cylinder at one side of the wagon body.
Figure 2 is a side elevation of the same, the upper portion of the wagon body being removed.

Referring now to the drawings, and first to Figure 3, the frame of the wagon comprises a pair of Z-rails 15 disposed at opposite sides of the wagon with the lower flanges extending inwardly, and the rails 15 are connected by cross pieces 16 disposed at suitable points of vantage throughout the length of the frame. Supported between the side rails 15 is the intermediate section 17 of the wagon body. Seated on the top flanges of the side rails 15 is the upper section 18 of the wagon body and the two sections 17 and 18 are continuously flared upwardly into substantially hopper form in the usual manner for carrying a load of material adapted to be discharged through the bottom portion 19 of the wagon. The bottom portion 19 is of substantially box form and extends throughout the major portion of the wagon and is closed by a pair of doors or gates 20 comprising the bottom of the wagon body. The doors 20 are hinged at their outer edges as at 21 to the lower ends of the side walls of the wagon body. The forward end of the wagon body is stepped upwardly from the gates or doors 20 and is closed by a hinge door or gate 22 mounted at its forward edge on a transverse hinge 23 which is arranged substantially beneath the front wall of the hopper body.

A cross piece or sill 24 extends between the side rails 15 at the forward ends of the gates 20 and the front bottom 22 is adapted to lie flush with the upper edge of the sill 24 when closed.

The wagon frame and body are supported upon any suitable running gear, shown in dotted lines in Figure 3, and which is directly mounted upon the rear axle 26 carrying the rear wheels 27. The forward end of the wagon body is preferably mounted upon a tractor or the like having an axle 28 adapted to extend beneath the upwardly offset portion of the wagon frame and which is provided with wheels 29 adapted to turn beneath the offset forward end of the wagon frame.

The rear end of each door or gate 20 has secured thereto one end of a chain 30. The chains 30 extend upwardly about the rear end of the bottom section 19 of the wagon body and pass over idler pulleys 31 and extend laterally therefrom to the sides of the body. The frame is provided with outstanding horizontal flanges 32 beneath which are disposed pulleys 33 over which the chains 30 pass, the chains extending forwardly a desired distance from the pulleys 33 and connected to the rear ends of connecting rods 34 which extend forwardly along the opposite outer sides of the wagon body.

The forward ends of the rods 34 are pivotally connected to the cross heads or movable blocks 35 which are disposed at opposite sides of the wagon frame near the forward end thereof. The blocks 35 each have a chain 37 connected at one end thereto and extending rearwardly over horizontal pulleys 38 mounted on the frame at opposite ends of the sill 24, the chains 37 extending inwardly from the pulleys 38 to the forward end pulleys 39 mounted on the front wall of the bottom section 19 of the wagon body. From the pulleys 39 the chains 37 extend downwardly to the forward ends of the bottom gates 20.

The cross heads or movable blocks 35 are each provided with a second chain 40 which extends rearwardly and over substantially vertical pulleys 41 mounted in brackets 42 at the outer sides of the side bars 15 and at opposite ends of the sill 24. The chains 40 extend downwardly from the pulleys 41 and across the lower side of the front bottom 22 so that when the chains 40 are drawn taut, the bottom 22 is raised and held in such position. The chains 40 may be connected together beneath the bottom 22 as shown, or may be otherwise operatively engaged with the bottom.

Each movable block 35 is provided with a forwardly extending chain 43. The chains 43 are secured to and rolled upon drums 44 mounted on the opposite end portions of a transverse shaft 45 carried upon the wagon frame and which is adapted to be turned for drawing the slide blocks 35 forwardly. The shaft 45 is provided at a convenient point with a ratchet wheel 46 secured to the shaft and which is adapted for engagement with a locking dog 47 mounted on the lever 48. The lever 48 is pivotally mounted at its lower end upon a bracket 49 carried by the wagon frame while the upper end of the lever 48 is pivotally connected to a link 50 which extends over the ratchet wheel 46 and forwardly thereof and is pivotally connected at its lower end to the short arm of a bell crank lever 51, the latter being pivoted at 52 upon the frame of the machine. The bracket 49 is preferably disposed rearwardly of the ratchet wheel 46 and the teeth of the ratchet wheel are preferably disposed to face forwardly at the upper portion of the ratchet wheel. The link 50 is curved downwardly and the operating lever 51 is mounted on the frame in advance of the ratchet wheel 46 as clearly shown in Figure 2.

A chain 53 or the like is connected to the bell crank lever 51 at its long end and is adapted to be drawn taut for swinging the lever 51 to raise the link 50 and swing the lever 48 rearwardly a distance sufficient to disengage the dog 47 from the teeth of the ratchet wheel 46, freeing the shaft 45 so that the slide blocks 35 may move rearwardly.

One end of the shaft 45 is provided with an operating drum 54 about which is wound one end of a chain 55, the latter being carried rearwardly to a cylinder 56. The cylinder 56, as clearly shown in Figures 2, 3 and 5, is seated in a saddle 57 or the like which is bolted or otherwise suitably mounted upon the wagon frame and reinforced by braces 58 as shown and which is held in place in the saddle by straps or clamps 59. The forward end of the cylinder 56 is provided with a central opening through which the chain 55 passes, an anti-friction roller 60 being disposed at the forward end of the cylinder to hold the chain in coaxial alinement therewith. The rear end of the chain 55, as shown in Figure 4, is connected to an eye bolt 61 which provides the central portion of a double piston. The eye bolt 61 is provided with spaced pairs of discs 62 between which are clamped flexible washers 63 which are sealed against the inner wall of the cylinder 56.

A spacer tube 64 is mounted on the bolt 61 to hold the pairs of discs 62 apart, and a clamping nut 65 is threaded upon the rear end of the bolt 61 to clamp the discs upon the packing gaskets 63 and against the opposite ends of the tube 64. The cylinder 56 is provided with a plug 66 or the like for admitting oil or other lubricant to the space between the pistons so as to suitably lubricate the same and maintain the packing discs 63 in flexible and sealing condition.

The forward end of the cylinder 56 is provided, coaxially as shown, or at any other suitable point, with a coupling nipple 67 to which is attached a flexible hose 68 adapted for connection with the intake manifold of an internal combustion engine, or other source of suction or air displacement so as to at least partially evacuate the rear end of the cylinder 56 to cause the pistons to advance rearwardly in the cylinders and turn the shaft 45.

In operation, when the rear and front bottom gates 20 and 22 are closed, the chain 55 of the cylinder is drawn rearwardly and partially unwound from the drum 54. The chains 43 of the sliding blocks 35 are wound nearly completely upon the drums 44.

The locking dog 47 is engaged with the ratchet wheel 46 so as to hold the shaft 45 locked, the tension for holding the ratchet wheel in place being derived from the weight of the doors 20 and 22, and any material which may be disposed in the wagon body.

To dump the contents from the wagon body, it is only necessary that the operator pull the chain 53 so as to release the locking dog 47, as above described, and free the shaft 45. When this takes place the bottom doors 20 and 22 swing downwardly under the weight of the load and the wagon is drawn forwardly after dumping the load so as to clear the bottom gates. When this is done the flexible pipe or hose 68 is open, by means of a valve or the like, with the intake manifold so that suction in the rear end of the cylinder 56 reduces the air pressure at the rear sides of the pistons and the latter are thus forced rearwardly by atmospheric pressure through the front ends of the cylinder to pull the chain 55 and unwind it from its drum 54. The result is that the shaft 45 is rotated in such direction as to wind the chains 43 on their drums 44 and pull the slide blocks 35 forwardly, lifting the doors into closed position. The chains 43 are so wound upon the drums 44 that the ratchet wheel 46 rides under the dog 47, and the dog is thus in position to immediately engage the ratchet wheel and hold it from turning backwardly, thus locking the doors in raised position.

It is obvious that various changes and modifications may be made in the details of construction and design of the above specifically described embodiment of this invention without departing from the spirit thereof, such changes and modifications being restricted only by the scope of the following claims.

What is claimed is:—

1. A dump wagon comprising a body portion having a pair of rear bottom doors and a front bottom door offset upwardly from said rear bottom doors, longitudinal hinges for the rear bottom doors, a transverse hinge for the forward bottom door, a pair of blocks disposed at opposite sides of the wagon frame, flexible connections between the opposite ends of said rear doors and the blocks, a flexible connection between said blocks and the forward bottom door, a transverse shaft forwardly of said doors, a pair of block chains carried by the blocks and wound in one direction upon said shaft, a pneumatic cylinder mounted on one side of the wagon frame, a piston in the cylinder, a single chain connected at one end to the piston and having its opposite end wound upon the shaft in a direction opposite to said block chains, suction means connected to the cylinder for operating the piston therein to turn the shaft and wind the block chains thereon and lift said bottom doors, and releasable locking means for said shaft to hold the same from retrograde movement when the doors are raised.

2. In a dump wagon having a body portion, a pair of rear bottom doors and a front bottom door, a pair of blocks disposed at opposite sides of the wagon frame, and bendable means to connect the blocks with the rear and forward doors, the combination of a transverse shaft forwardly of said doors, flexible means carried by the blocks and wound in one direction upon said shaft, a pneumatic cylinder mounted on the wagon frame and having a piston slidable therein, flexible means connecting said piston into said shaft and windable on the same in an opposite direction to said first flexible means, suction means adapted to be connected to the cylinder for operating the piston therein to raise the said bottom doors, and releasable locking means for said shaft to hold the same from retrograde movement when the doors are raised.

3. A dump wagon comprising a body portion having a pair of rear bottom doors and a front bottom door offset upwardly from said rear bottom doors, hinges for the rear bottom doors and the forward bottom door, a pair of blocks disposed at opposite sides of the wagon frame, flexible connections between the opposite ends of said rear doors and the blocks, a flexible connection between said blocks and the forward bottom door, a transverse shaft forwardly of said doors, a plurality of block chains carried by the blocks and wound in one direction upon said shaft, a pneumatic cylinder mounted on one side of the wagon frame and having a piston slidable therein, a single chain connected at one end to the piston and having its opposite end wound upon the shaft in a direction opposite to said block chains, suction means adapted to be connected to the cylinder for operating the piston therein to turn the shaft and wind the block chains thereon and lift said bottom doors, and releasable locking means for said shaft to hold the same from retrograde movement when the doors are raised.

EMIL A. SELL.